US012180753B2

(12) United States Patent
Bunger et al.

(10) Patent No.: US 12,180,753 B2
(45) Date of Patent: Dec. 31, 2024

(54) CONTAINER LOCKING SYSTEM

(71) Applicants: Steve Bunger, Phoenix, AZ (US); Connor Bunger, Phoenix, AZ (US)

(72) Inventors: Steve Bunger, Phoenix, AZ (US); Connor Bunger, Phoenix, AZ (US)

( * ) Notice: Subject to any disclaimer, the term of this patent is extended or adjusted under 35 U.S.C. 154(b) by 392 days.

(21) Appl. No.: 17/551,848

(22) Filed: Dec. 15, 2021

(65) Prior Publication Data

US 2022/0106816 A1 Apr. 7, 2022

Related U.S. Application Data

(63) Continuation-in-part of application No. 16/440,877, filed on Jun. 13, 2019, now Pat. No. 11,236,532.

(51) Int. Cl.

| | |
|---|---|
| ***E05B 77/46*** | (2014.01) |
| ***E05B 9/02*** | (2006.01) |
| ***E05B 17/00*** | (2006.01) |
| ***E05B 17/20*** | (2006.01) |
| ***E05B 55/00*** | (2006.01) |
| ***E05B 59/00*** | (2006.01) |
| ***E05B 65/00*** | (2006.01) |

(Continued)

(52) U.S. Cl.
CPC ................ *E05B 77/46* (2013.01); *E05B 9/02* (2013.01); *E05B 17/0004* (2013.01); *E05B 17/2003* (2013.01); *E05B 55/00* (2013.01); *E05B 59/00* (2013.01); *E05B 65/0003* (2013.01); *E05B 83/02* (2013.01); *E05C 1/04* (2013.01); *E05F 5/06* (2013.01)

(58) Field of Classification Search
CPC .... E05B 17/002; E05B 17/20; E05B 17/2003; E05B 17/2084; E05B 17/2092; E05B 55/00; E05B 55/005; E05B 59/00; E05B 65/0003; E05B 67/22; E05B 67/38; E05B 77/46; E05C 1/04; E05C 1/06; E05C 7/00; E05C 7/04; E05C 7/045; B65D 88/12; B65D 88/121; B65D 2211/00
See application file for complete search history.

(56) References Cited

U.S. PATENT DOCUMENTS 5,029,909 A * 7/1991 Bunger ................. E05B 67/383 70/48
6,065,314 A * 5/2000 Nicholson ............. E05B 67/383 70/56

(Continued)

*Primary Examiner* — Christopher J Boswell
(74) *Attorney, Agent, or Firm* — John D. Tran; Rhema Law Group, P.C.

(57) ABSTRACT

A locking system and method of manufacture can include: a cargo container having a first container door, a second container door, and a container frame base; a lock box affixed to the second container door, the lock box extended into and through the second container door, the lock box including a sliding lock rod configured to extend behind the first container door when the lock box is in a locked configuration; a sliding lock rod guard affixed to a first exterior surface of the first container door and affixed to a second exterior surface of the second container door; door guards affixed to the second container door and the first container door; and a drop lock affixed to an interior surface of the first container door, the drop lock including a drop lock rod configured to extend down into the container frame base when the drop lock is in the locked configuration.

18 Claims, 8 Drawing Sheets

(51) Int. Cl.

| | |
|---|---|
| ***E05B 83/02*** | (2014.01) |
| ***E05C 1/04*** | (2006.01) |
| ***E05F 5/06*** | (2006.01) |

(56) References Cited

U.S. PATENT DOCUMENTS

| | | | | |
|---|---|---|---|---|
| 6,508,087 | B2 * | 1/2003 | Lemley | E05C 9/16<br>70/56 |
| 6,592,155 | B1 * | 7/2003 | Lemley | E05B 67/38<br>292/7 |
| 6,758,076 | B1 * | 7/2004 | Åsen | E05C 19/003<br>292/259 R |
| 11,008,788 | B2 * | 5/2021 | Brown | E05B 67/38 |
| 11,236,532 | B2 * | 2/2022 | Bunger | E05B 67/383 |
| 2007/0262588 | A1 * | 11/2007 | Lemley | E05B 67/38<br>292/36 |
| 2009/0107190 | A1 * | 4/2009 | Nielsen | E05B 67/383<br>70/158 |
| 2018/0163441 | A1 * | 6/2018 | Brown | E05B 67/38 |

* cited by examiner

CONTAINER LOCKING SYSTEM

TECHNICAL FIELD

This disclosure relates to locking systems, more particularly to locking systems for cargo containers.

BACKGROUND

The portable storage industry includes, as one aspect, large shipping containers which can be used to store belongings. These belongings can be valuable in terms of confidentiality and replacement value.

Illustratively, storage containers are used to store tools, inventory, files, belongings, among other valuables. In many cases, a cargo container is placed in remote locations, for examples on new construction sites.

With any cargo container, maintaining security for the contents is a prime concern. Because cargo containers are often left unattended, they become targets for thieves and other criminals.

Thus, the manufacturers and users of cargo containers continue to seek and develop better security techniques while the criminals continue to develop methods for circumventing any security measures.

Cargo container break-ins typically involve a thief using simple tools in order to cut the lock off or pry open the doors. One of these tools can include a Sawzall to either cut the lock off or cut internal bars. Pry bars are used to pry the lock off or to pry open the door. Drills are used to drill out the lock.

Many prior developments have been advanced to provide security for the contents of cargo containers. These prior developments have provided only partial solutions.

Some prior developments included locking systems that utilize an internal locking bars and a puck lock. The weakest part of this prior development is the positioning of the puck lock because a 90-degree drill can be used to simply drill out the keyhole of the lock.

Drilling out the keyhole can be achieved in about five minutes, which illustrates the vulnerability of this prior development. Further, these prior developments are vulnerable to drilling out the actual lock where the bar is or simply using a pry bar to pry the lock off.

Solutions have been long sought but prior developments have not taught or suggested any complete solutions, and solutions to these problems have long eluded those skilled in the art. Thus, there remains a considerable need for devices and methods that can prevent thieves from using simple tools like drills and pry bars to break into cargo containers.

SUMMARY

A container locking system and method of manufacture are disclosed which prevents thieves from using either pry bars or drills from breaking into cargo containers. The container locking system also makes it very difficult and time consuming to use a Sawzall to cut into the locking system and forcefully push or pull the container doors open.

The locking system and methods can include: a cargo container having a first container door, a second container door, and a container frame base; a lock box affixed to the second container door, the lock box extended into and through the second container door, the lock box including a sliding lock rod configured to extend behind the first container door when the lock box is in a locked configuration; a sliding lock rod guard affixed to a first exterior surface of the first container door and affixed to a second exterior surface of the second container door, the sliding lock rod guard for preventing access to the sliding lock rod from between the first container door and the second container door; door guards affixed to the second container door and the first container door for preventing the first container door and the second container door from being pushed into the cargo container; and a drop lock affixed to an interior surface of the first container door, the drop lock including a drop lock rod configured to extend down into the container frame base when the drop lock is in the locked configuration.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The locking system is illustrated in the figures of the accompanying drawings which are meant to be exemplary and not limiting, in which like reference numerals are intended to refer to like components, and in which.

DETAILED DESCRIPTION

Figure 1:
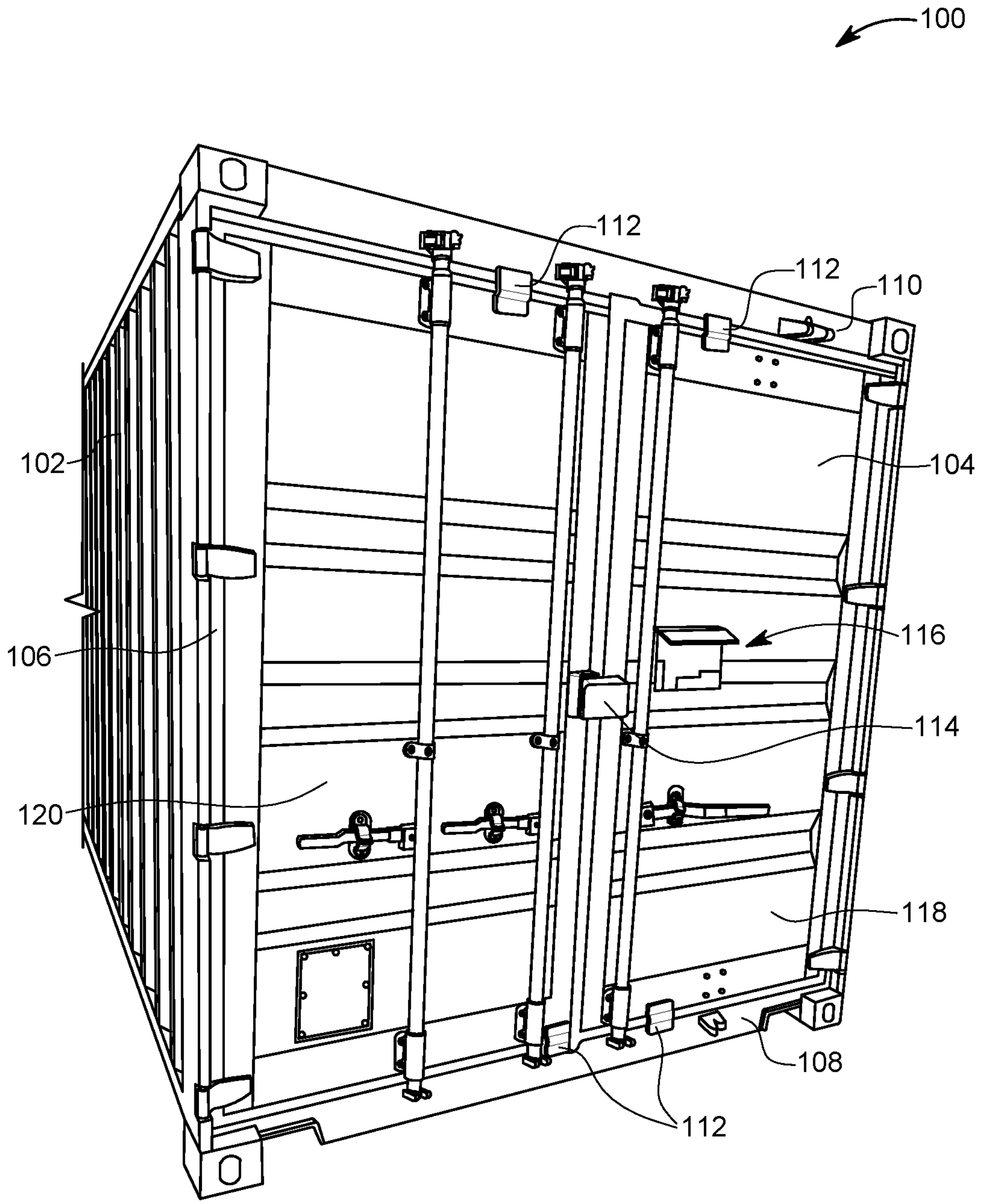
FIG. 1 is an exterior isometric view of the locking system.

In the following description, reference is made to the accompanying drawings that form a part hereof, and in which are shown by way of illustration, embodiments in which the locking system may be practiced. It is to be understood that other embodiments may be utilized and structural changes may be made without departing from the scope of the locking system.

When features, aspects, or embodiments of the locking system are described in terms of steps of a process, an operation, a control flow, or a flow chart, it is to be understood that the steps can be combined, performed in a different order, deleted, or include additional steps without departing from the locking system as described herein.

The locking system is described in sufficient detail to enable those skilled in the art to make and use the locking system and provide numerous specific details to give a thorough understanding of the locking system; however, it will be apparent that the locking system may be practiced without these specific details.

In order to avoid obscuring the locking system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs.

As used herein, the term system is defined as a device or method depending on the context in which it is used. For expository purposes, the term "horizontal" as used herein is defined as a plane parallel to the top plane or surface of the cargo container, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane.

Referring now to FIG. 1, therein is shown an exterior isometric view of the locking system 100. The locking system 100 can be installed on a cargo container 102. It is contemplated that the cargo container 102 can be an ISO compliant shipping container.

The cargo container 102 includes container doors 104 hinged along a container frame 106. The container frame 106 can include a container frame base 108 and a cargo frame top 110.

From the exterior of the cargo container 102, the locking system 100 can include door guards 112, a sliding lock rod guard 114, and a lock box 116.

Each of the container doors 104 can be fitted with two of the door guards 112. Illustratively, for example, a right container door 118 can include one of the door guards 112 at the top of the right container door 118 for contacting the cargo frame top 110 when the right container door 118 is closed.

The right container door 118 can further include one of the door guards 112 at the bottom of the right container door 118 for contacting the container frame base 108 when the right container door 118 is closed. Similarly, a left container door 120 can include one of the door guards 112 at the top of the left container door 120 for contacting the cargo frame top 110 when the left container door 120 is closed.

The left container door 120 can further include one of the door guards 112 at the bottom of the left container door 120 for contacting the container frame base 108 when the right container door 118 is closed. The door guards 112 can first act to prevent the container doors 104 from being pushed or pried inward, and thereby prevent unauthorized access, since the container doors 104 will be incapable of being pushed past the container frame 106.

Figure 4:
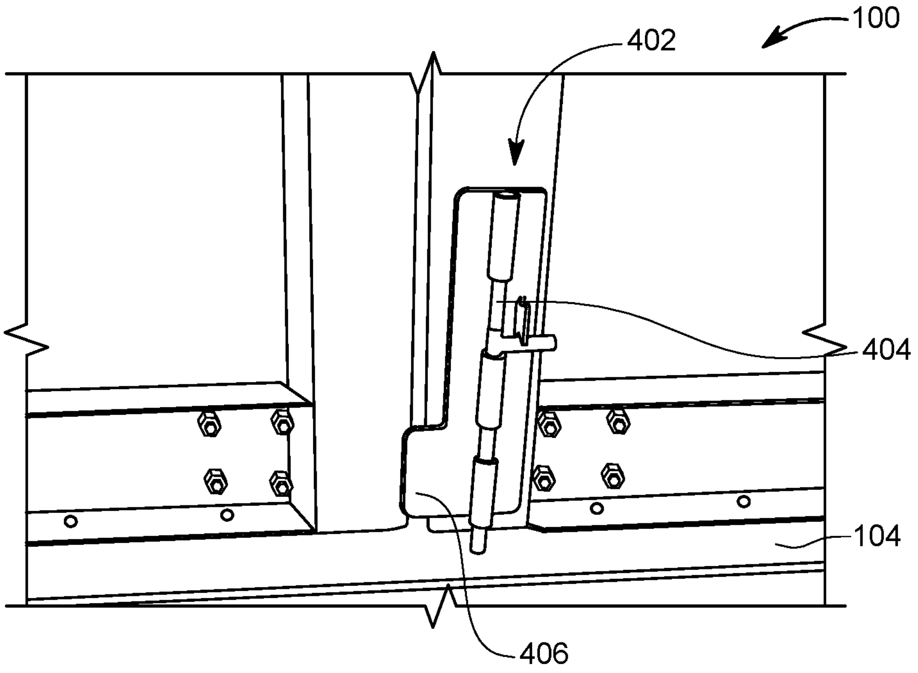
FIG. 4 is a second interior isometric view of the locking system of FIG. 1.

The door guard 112 contacting the container frame base 108 and affixed to the left container door 120 can provide the additional and simultaneous benefit of preventing the drop lock rod 404 for the drop lock 402, both of FIG. 4, from being cut with a Sawzall, for example. The door guards 112 can be welded to the container doors 104.

Figure 2:
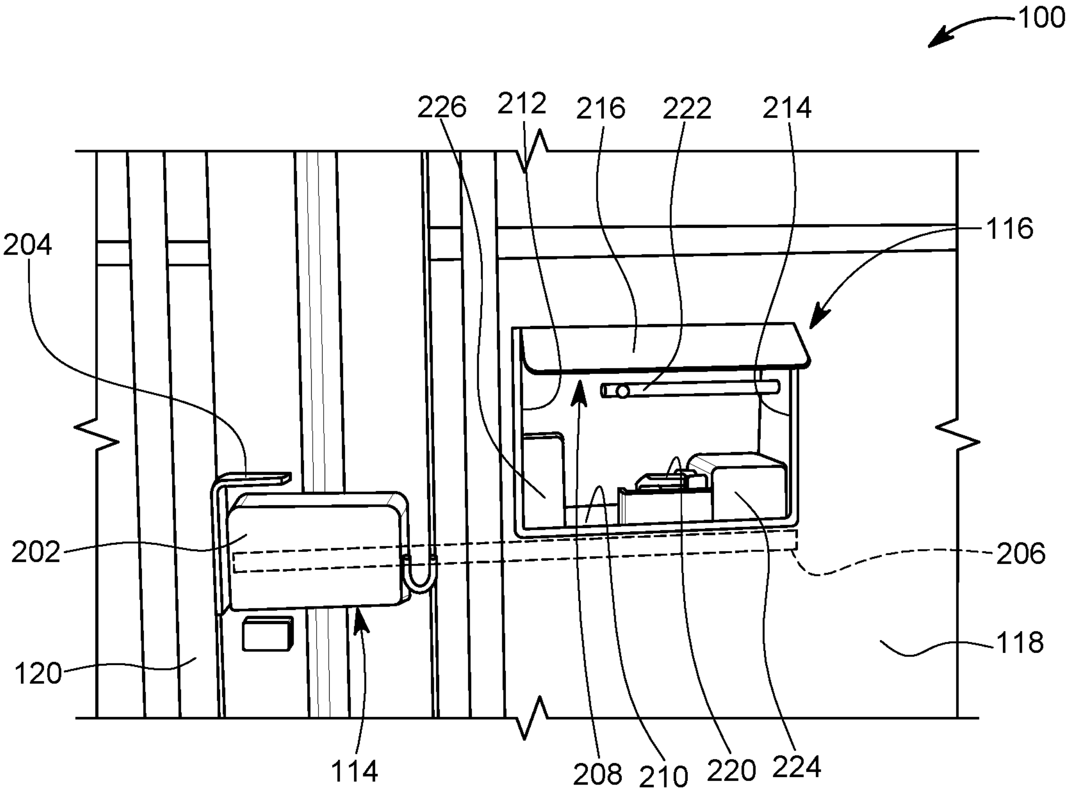
FIG. 2 is a plan view of the lock box of FIG. 1 and the rod guard of FIG. 1.

The sliding lock rod guard 114 can be affixed to both the right container door 118 and the left container door 120 for preventing the sliding lock rod 206 of FIG. 2 from being cut, for example with a Sawzall from between the right container door 118 and the left container door 120.

The lock box 116 can be fitted and incorporated into the left container door 120, for example. It is contemplated that the door guards 112, the sliding lock rod guard 114, and the lock box 116 can be formed of steel and securely welded onto the container doors 104 to prevent unauthorized access to the cargo container 102.

Referring now to FIG. 2, therein is shown a plan view of the lock box 116 of FIG. 1 and the rod guard 114 of FIG. 1. The sliding lock rod guard 114 can include a rod guard extended body 202 and a rod guard edge protector 204.

The rod guard extended body 202 can be affixed to the right container door 118 and extend over the left container door 120 when the container doors 104 of FIG. 1 are shut. The rod guard extended body 202 can protect a sliding lock rod 206, extended behind both the left container door 120 and the right container door 118, from being accessed and cut.

The rod guard edge protector 204 can be affixed to the left container door 120. The rod guard extended body 202 can fit within the rod guard edge protector 204 when the container doors 104 are closed.

The rod guard edge protector 204 can be shaped to follow a perimeter of the rod guard extended body 202 overlapping the left container door 120. The rod guard edge protector 204 can prevent the rod guard extended body 202 from being pried with a crow bar.

That is, the rod guard edge protector 204 can closely follow the perimeter edge of the rod guard extended body 202 and prevent access to the edge of the rod guard extended body 202 that covers the left container door 120. The rod guard edge protector 204 can be welded to the left container door 120.

The lock box 116 is shown to have a top side 208, a bottom side 210, a left side 212, and a right side 214. The lock box 116 together with the sliding lock rod guard 114 can be made of heavy-duty steel.

The lock box 116 is depicted having a rain guard 216 projecting outward, and at a downward angle, from the top side 208. The rain guard 216 can protect the lock box 116 from letting rain into the lock box 116.

More importantly, the rain guard 216 can strictly limit access angles to the lock box 116 which can prevent a lock 220 from being exposed to a pry bar or drill. The lock box 116 is further shown having a handle 222 that is used to engage or disengage the locking system 100.

Illustratively, when the handle 222 is moved fully right, the sliding lock rod 206 coupled thereto is also moved right, disengaging the sliding lock rod 206 from behind the left container door 120 allowing the container doors 104 to be opened.

Figure 3:
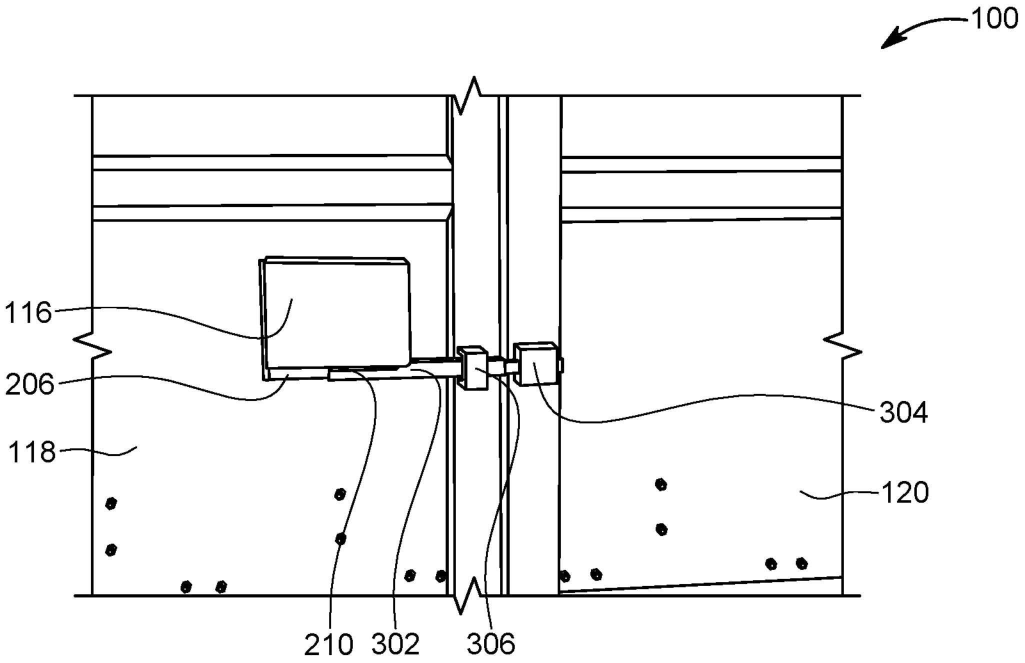
FIG. 3 is a first interior isometric view of the locking system of FIG. 1.

Continuing with this example, when the handle 222 is moved fully left, the sliding lock rod 206 coupled thereto is also moved left, engaging the sliding lock rod 206 with the lock rod receiver 304 of FIG. 3 behind the left container door 120. Engaging the sliding lock rod 206 can prevent the container doors 104 from being opened.

The sliding lock rod 206 can be made of solid and hardened steel, making the sliding lock rod 206 difficult to cut. The lock 220 can be placed within a lock encasement 224 and over the locking tab 704 of FIG. 7.

The lock encasement 224 can be welded to the bottom side 210 and the right side 214 of the lock box 116. The lock encasement 224 can have an opening for the lock 220 to be placed therein.

The lock encasement 224 can be made of hardened steel and fully surround the lock 220, with the exception of the key hole and top of the lock 220. A lock box guard 226 is further depicted within the lock box 116.

The lock box guard 226 can be welded to the bottom side 210 and the left side 212 of the lock box 116. The lock box guard 226 can be made of high strength steel and together with the rain guard 216, the lock encasement 224, and the sides of the lock box 116 can eliminate access angles to the lock 220.

The dimension of the lock box 116, the rain guard 216, the lock encasement 224, and the lock box guard 226 prevent the lock 220 from being pried open with a crow bar or drilled out with a drill. It has been discovered that the positions, angles, and dimensions of the lock box 116, the rain guard 216, the lock encasement 224, and the lock box guard 226 together with the location of the lock 220 within the lock box 116 prevent the key hole of the lock 220 from being drilled out, prevent the top of the lock 220 from being drilled or cut, and prevent the lock 220 from being pried off with different size pry bars.

Referring now to FIG. 3, therein is shown a first interior isometric view of the locking system 100 of FIG. 1. The locking system 100 is depicted having the lock box 116 positioned on the right container door 118.

The sliding lock rod 206 can be seen extended behind and across both the left container door 120 and the right container door 118. The sliding lock rod 206 is shown extended through a lock rod sleeve 302 on the right container door 118, extended through a lock rod receiver 304 on the left container door 120, and extended through a U-channel 306 welded, or otherwise affixed, to the right container door 118.

As will be appreciated, when the handle 222 of FIG. 2 is slid to the left (from the outside of the cargo container 102 of FIG. 1), the locking system 100 is engaged. It is engaged because the handle 222 is coupled to the sliding lock rod 206 and as the handle 222 is moved, the sliding lock rod 206 slides inside the lock rod sleeve 302 and protrudes from the lock rod sleeve 302 behind the left container door 120.

The sliding lock rod 206 behind the left container door 120 secures both container doors 104 of FIG. 1 because the right container door 118 overlaps the left container door 120. The lock rod sleeve 302 can be welded to the bottom side 210 of the lock box 116. The lock rod sleeve 302 can also be welded directly to the right container door 118, and on a portion of the right container door 118 next to the left container door 120. The lock rod receiver 304 can be welded to the left container door 120.

The U-channel 306 can be welded to the right container door 118 covering the lock rod sleeve 302 and the sliding lock rod 206. The U-channel 306 can extend fully around portions of the lock rod sleeve 302 not facing the right container door 18. The U-channel 306 can thereby operate as additional reinforcement to protect the lock rod sleeve 302 and the sliding lock rod 206.

When extreme force is applied to the right container door 118 or the left container door 120, for example during a break in, the lock rod sleeve 302 could crack allowing the sliding lock rod 206 to move more freely and compromise the security of the locking system 100. It has been discovered that the U-channel 306 can prevent the lock rod sleeve 302 from breaking, cracking, or allowing the sliding lock rod 206 to move freely.

Referring now to FIG. 4, therein is shown a second interior isometric view of the locking system 100 of FIG. 1. The locking system 100 is depicted having a drop lock 402 welded to the left container door 120.

The drop lock 402 can be useful in securing the left container door 120 in the closed position. The drop lock 402 can be engaged when a drop lock rod 404 slides down from within the drop lock 402 and into the container frame base 108.

The drop lock 402 can prevent the container doors 104 of FIG. 1 from being pulled away from the cargo container 102 of FIG. 1. The drop lock 402 can further include a drop lock tab 406.

The drop lock tab 406 can overlap the back side of the right container door 118 when the right container door 118 is closed. The drop lock tab 406 can, in this way, further prevent the left container door 120 from being pulled out when the sliding lock rod 206 of the lock box 116, both of FIG. 2, are engaged. The drop lock tab 406 can further prevent the right container door 118 from being pushed in.

Figure 5:
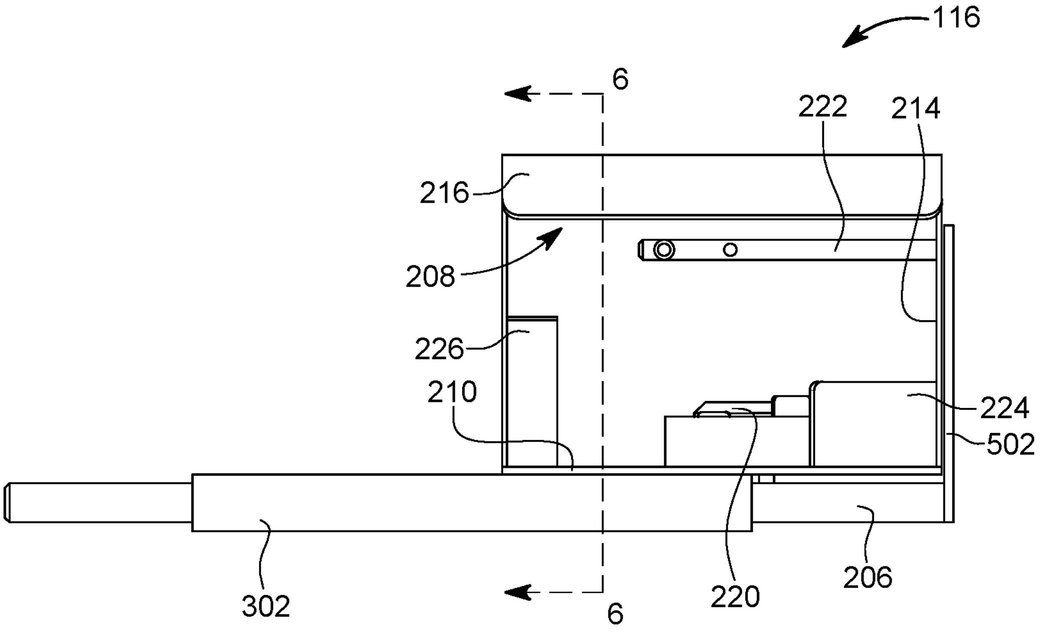
FIG. 5 is a front side view of the lock box of FIG. 1.

Referring now to FIG. 5, therein is shown a front side view of the lock box 116 of FIG. 1. The lock box 116 is depicted having the rain guard 216 extending down from the top side 208.

The handle 222 is shown extending into the body of the lock box 116 from and through the right side 214 of the lock box 116. The handle 222 can be connected to the sliding lock rod 206 with a vertical coupling rod 502, therebetween.

The vertical coupling rod 502 can extend vertically from the handle 222 to the sliding lock rod 206 positioned below the bottom side 210. The sliding lock rod 206 can extend from the vertical coupling rod 502 near the right side 214, and through the lock rod sleeve 302.

The lock box 116 is further shown having the lock encasement 224 around the lock 220. The lock encasement 224 is shown to extend 6.79 inches from the right side 214 of the lock box 116 toward the lock box guard 226. The lock box guard 226 can extend 3.75 inches up from the bottom side 210. The lock box guard 226 can extend can extend 1.25 inches from the left side 212 of the lock box 116 toward the lock encasement 224, and extend 3.75 inches from the bottom side 210.

It has been discovered that distance that the lock box guard 226 extends up from the bottom side 210 can importantly increase the angle used to pry or drill out the lock. It has further been discovered that the bottom edge of the rain guard 216 can also play an important role in decreasing the distance between it and the top of the lock encasement 224 through which the lock 220 can be accessed.

The distance between the lock box guard 226 and the lock encasement 224 can be 2.5 inches. The distance from the lock 220 to the top side 208 can be 5 ⅞ inches. The distance from the lock 220 to the bottom edge of the rain guard 216 can be 4 ⅜ inches.

The lock 220 can be placed on the bottom side 210 of the lock box 116 and being 3.17 inches from the left side 212. The lock encasement 224 closest to the lock 220 can allow only a small upper surface of the lock 220 to be seen from the front of the lock box 116.

The size and position of both the lock box guard 226 and the lock encasement 224 can function to prevent a crowbar from being used to engage the lock 220 within the lock encasement 224. Further, the size and position of both the lock box guard 226 and the lock encasement 224 can function to prevent a Sawzall or drill from being used to engage the lock 220 within the lock encasement 224.

It has been discovered that the angles and dimensions of the lock box 116, the location of the lock 220 inside the lock box 116, the size and position of the lock box guard 226, the rain guard 216, the steel of the lock encasement 224 around the lock 220 protect the lock 220, which is the weakest link on any locking system. The lock 220 can be attacked by attempting to drill out the key hole, drill out the top of the lock, using different size pry bars to try and pry the lock 220 off, and cut with a Sawzall. All of the angles and position of the parts of the lock box 116 make it impossible to get a medium size or larger pry bar or drill into position to try and compromise the puck lock.

It has been further discovered that a standard or 90-degree drill cannot be used to drill out the keyhole of the lock 220. Instead, the lock box guard 226 that is welded to the right side 214 of the lock box 116 must first be taken out with a blow torch. Once that is done, a specialized shorten drill bit can be used to drill out the keyhole of the lock 220. In addition, since the lock 220 is lying horizontally, it is very tricky to drill out the keyhole of the lock 220 in a way that the lock 220 tumblers fall out, which is an improvement over other locking systems where the tumblers of locks are easier to remove.

The hardened steel sliding lock rod 206, coupled to the handle 222 and sliding within the lock rod sleeve 302, can slide behind the left container door 120 of FIG. 1 with the right container door 118 of FIG. 1 overlapping the left container door 120. The sliding lock rod 206 can be made of hardened steel and is protected by a large steel box, the sliding lock rod guard 114 of FIG. 1, which is welded to the right container door 118 and overlaps the left container door 120.

Figure 6:
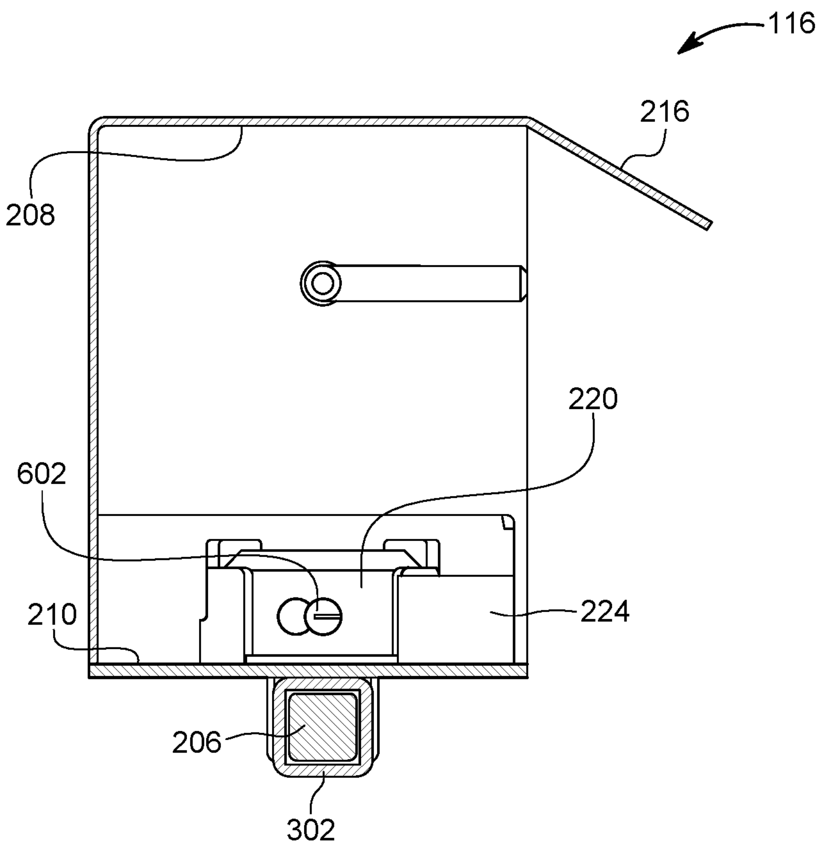
FIG. 6 is a cross-sectional view of the lock box of FIG. 1 along the line 6-6 of FIG. 5.

Referring now to FIG. 6, therein is shown a cross-sectional view of the lock box 116 of FIG. 1 along the line 6-6 of FIG. 5. The lock 220 can be seen with a keyhole 602.

The lock 220 can be horizontal over the bottom side 210 of the lock box 116 with the keyhole 602 facing the left side 212 of FIG. 5 of the lock box 116. The lock 220 can be seen with the lock encasement 224 surrounding the sides of the lock 220 while allowing the keyhole 602 to be exposed from the lock encasement 224.

The vertical space between the top of the lock 220 and the top side 208 of the lock 220 has been discovered to be an important dimension in preventing the lock 220 from being tampered with. Further, the restriction of the space between the top of the lock 220 and the top side 208 due to a 2-inch width of the rain guard 216 extending down and away from the lock 220, at a 60° angle from vertical, also prevents the lock 220 from being tampered with.

Yet further, the location of the lock 220 at the center of the bottom side 210 greatly restricts the range of access to the lock 220 for tampering purposes. Yet further, the location of the keyhole 602 facing toward the left side 212, the distance between the keyhole 602 and the left side 212, with access further restricted and blocked by the lock box guard 226, prevents tampering with the lock 220.

It has been discovered that the positions and the angles of the components within the lock box 116 create angles that make it impossible to either cut the lock 220 with a standard drill, a low profile 90-degree drill, or use a pry bar to pull off the lock 220 from the locking system 100. Further, the lock 220 installed horizontally inside the lock box 116 makes it much more difficult and time consuming to drill out the keyhole 602 of the lock 220 even if the lock 220 were accessed.

It is more difficult because the lock 220 has a tumbler locking system and it is very difficult, even for an expert, to drill into the key hole just far enough at a straight angle to the lock tumbler to free one of the tumblers and then do all seven of them. As previously noted, the only way to get access to the keyhole 602 of the lock 220 is to first use a blow torch to cut off the lock box guard 226.

However, as will be appreciated, if the thief has a blow torch, they can cut open a hole anywhere on the cargo container 102 of FIG. 1 to get access to the inside. Once the lock box guard 226 has been removed, a compressor, a 90-degree drill, and a specialized carbide wedge drill bit would be required to drill out the keyhole 602 of the lock 220. Even here, the drill bit would also have to be cut down because a full-sized drill bit cannot be used in the small space between the keyhole 602 of the lock 220 and the left side 212 of the lock box 116.

The sliding lock rod 206 is shown as a solid and hardened steel rod within the lock rod sleeve 302. The lock rod sleeve 302 can be welded underneath the bottom side 210 of the lock box 116.

Figure 7:
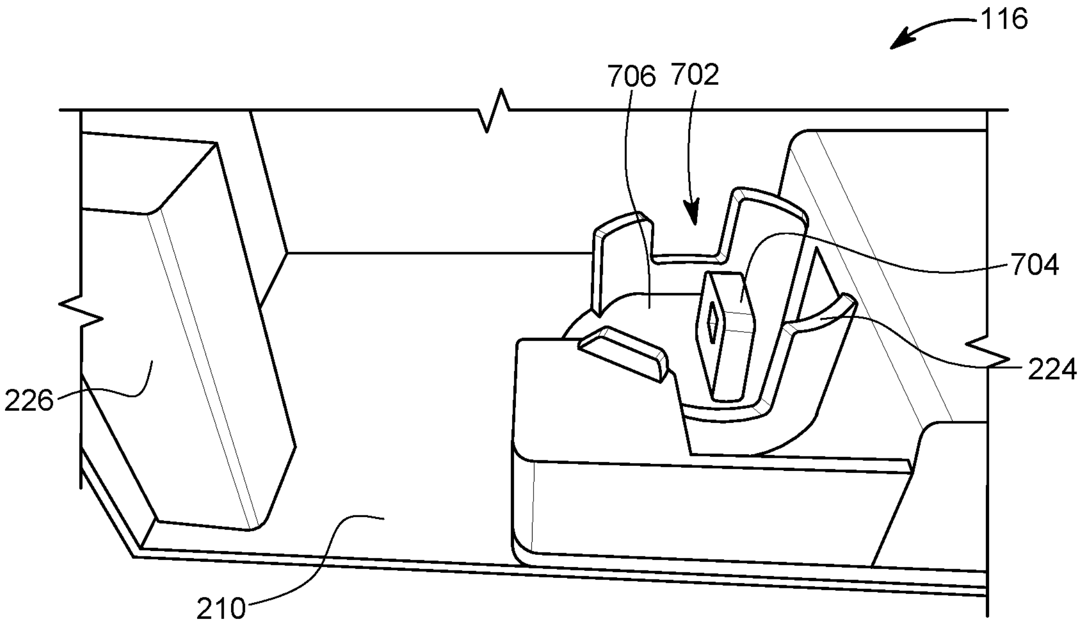
FIG. 7 is a top front isometric view of the lock box of FIG. 1.

Referring now to FIG. 7, therein is shown a top front isometric view of the lock box 116 of FIG. 1. The lock box 116 is depicted without the lock 220 of FIG. 2.

The lock encasement 224 is shown in a circular arrangement with lock notches 702 formed within sides of the lock encasement 224. The lock notches 702 can allow a user to gram portions of the lock 220 when the lock 220 is disengaged from a locking tab 704 within the lock encasement 224.

The lock 220 can be placed within the lock encasement 224 and over the locking tab 704. When locked, the lock 220 will engage with the locking tab 704 preventing the locking tab 704 from moving left or right.

The locking tab 704 is coupled or welded directly to the sliding lock rod 206 of FIG. 2. When the locking tab 704 is engaged by the lock 220, the locking tab 704 can prevent the sliding lock rod 206 and the handle 222 of FIG. 2 from moving left or right.

When the lock 220 is not engaged and is removed, the locking tab 704 can move freely and the sliding lock rod 206 and the handle 222 can move left to engage the sliding lock rod 206 within the lock rod receiver 304 of FIG. 3 and right to disengage the sliding lock rod 206. As depicted, the locking tab 704 is moved left and exposed within the lock encasement 224, meaning the sliding lock rod 206 is engaged with the lock rod receiver 304.

The lock encasement 224 can further include a lock base plate 706. When the lock 220 is placed within the lock box 116 and within the lock encasement 224, the lock 220 will sit in direct contact with the lock base plate 706.

The locking tab 704 can extend up through the bottom side 210 of the lock box 116 and through the lock base plate 706 of the lock encasement 224. The lock base plate 706 has been discovered to greatly increase the difficulty of prying the lock 220 because a pry bar cannot get a "bite" under the lock 220.

Figure 8:
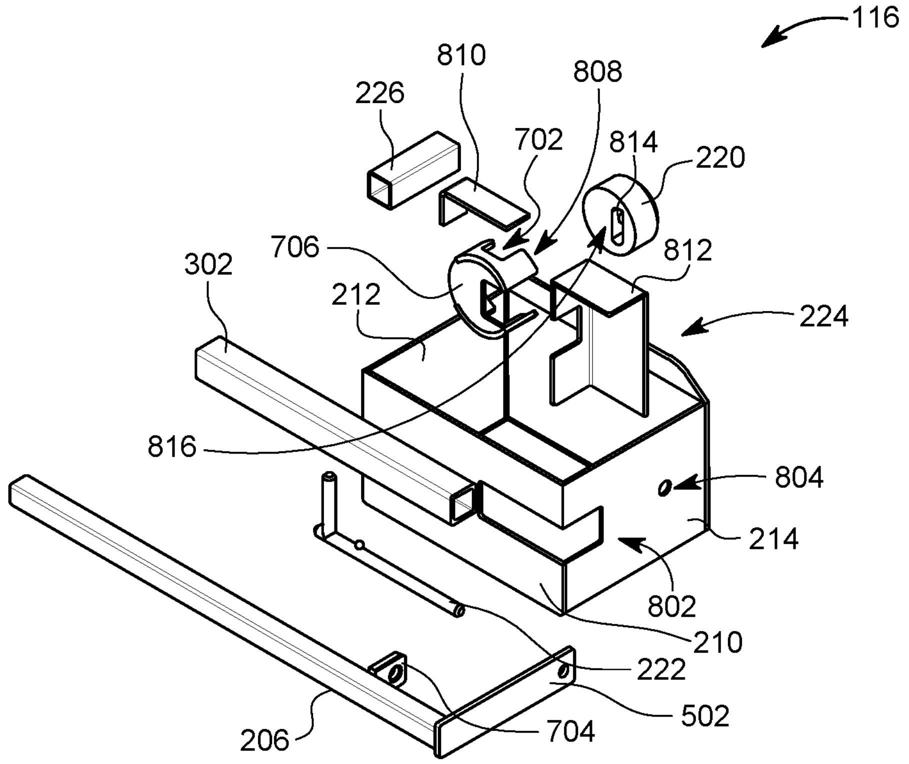
FIG. 8 is an exploded view of the lock box of FIG. 1.

Referring now to FIG. 8, therein is shown an exploded view of the lock box 116 of FIG. 1. The lock box 116 is depicted having the lock rod sleeve 302 coupled to the bottom side 210 of the lock box 116.

The lock rod sleeve 302 can extend from a middle portion of the bottom side 210 and extend past the left side 212 of the lock box 116. The bottom side 210 and the right side 214 have a tab hole 802 formed therein. The lock base plate 706 further includes the tab hole 802 formed therein.

The tab hole 802 allows the locking tab 704, coupled to the sliding lock rod 206, to move therein. The right side 214 further has a handle hole 804 for the handle 222 to move therein.

The handle 222 can be mounted within the lock box 116 and extend out of the lock box 116, through the handle hole 804 to contact and be welded to the vertical coupling rod 502 attached to the right end of the sliding lock rod 206.

The lock encasement 224 is depicted in three elements including a circular lock encasement 808, a lock encasement extension 810, and a lock encasement tab hole guard 812.

The circular lock encasement 808 can include the lock base plate 706 and the lock notches 702.

The circular lock encasement 808 can be formed integrally with the lock base plate 706 or can be formed separately and later welded together. The lock encasement extension 810 can be welded to the circular lock encasement 808 and extend out, laterally away from the circular lock encasement 808 limiting access to the lock 220.

The lock encasement tab hole guard 812 can be welded to the bottom side 210 of the lock box 116, the right side 214 of the lock box 116, the lock encasement extension 810, and the circular lock encasement 808. The lock encasement tab hole guard 812 can cover the tab hole 802 and prevent access to the sliding lock rod 206 from the tab hole 802.

The lock encasement tab hole guard 812, the lock encasement extension 810, the bottom side 210, and the right side 214 all have the tab hole 802 formed therein for allowing the locking tab 704 to move therethrough. The lock 220 is shown having a piston 814. The piston 814 can engage with the locking tab 704 when the lock 220 is locked.

The piston 814 can disengage with the locking tab 704 when the lock 220 is unlocked. The piston 814 can be within a tab recess 816. The locking tab 704 can fit within the tab recess 816. The lock box guard 226 can be affixed to the right side 214 of the lock box 116 adjacent to the lock encasement 224.

The handle 222 can include a movement arrester 818. The movement arrester 818 can be a small protrusion extending from the side of the handle 222. The movement arrester 818 can prevent the handle 222 from moving fully to the right through the handle hole 804.

Figure 9:
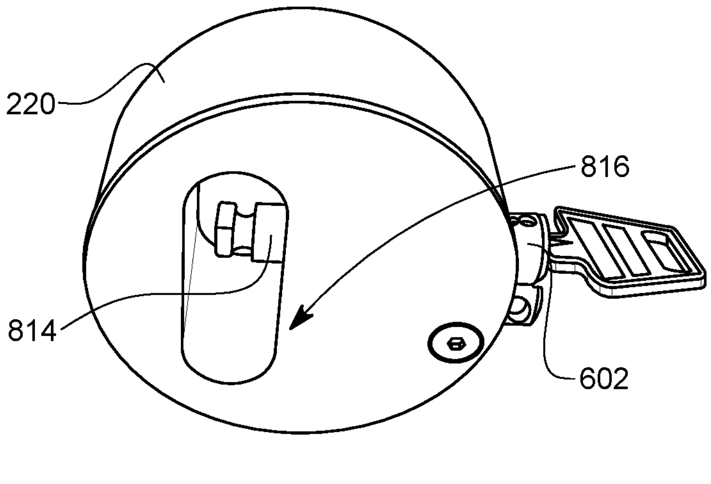
FIG. 9 is a bottom isometric view of the lock of FIG. 2.

Referring now to FIG. 9, therein is shown a bottom isometric view of the lock 220 of FIG. 2. The back of the lock 220 is shown having the tab recess 816 and the piston 814 exposed therein.

The keyhole 602 is shown on a side of the lock 220. The locking tab 704 of FIG. 7 can extend inside the tab recess 816 on the back of the lock 220.

Once in the locking tab 704 is placed within the tab recess 816, the user pushes the lock cylinder into the lock 220 which extends the piston 814 inside the lock 220. The piston 814 further extends into the hole on locking tab 704. When the lock 220 is placed into the lock box 116, the key and lock cylinder are pulled away from the lock 220.

Figure 10:
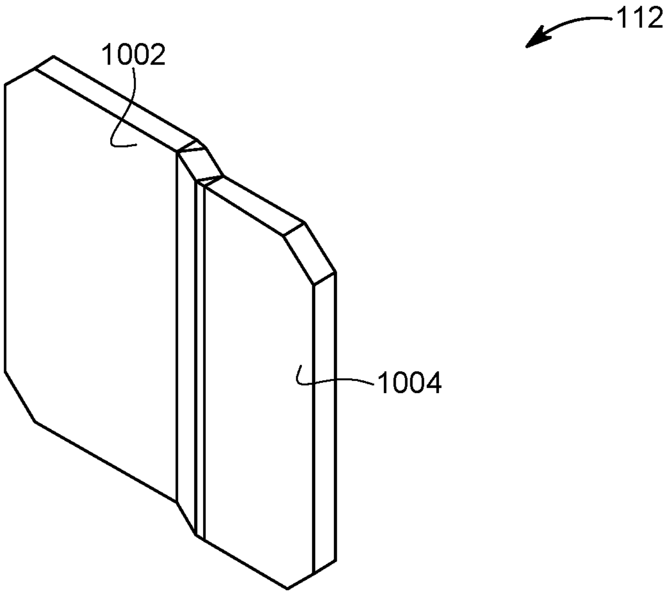
FIG. 10 is an isometric view of the door guard of FIG. 1.

Referring now to FIG. 10, therein is shown an isometric view of the door guard 112 of FIG. 1. The door guard 112 can be affixed externally to the container doors 104 of FIG. 1. A large contact portion 1002 can be welded to the container door 104.

The door guard 112 can angle away from the large contact portion 1002 toward a frame contact portion 1004. The frame contact portion 1004 can make direct contact with the container frame 106 of FIG. 1 when the container doors 104 are in a closed configuration.

It has been discovered that the door guard 112 can be made of hardened steel and can prevent the container doors 104 from being pushed into the cargo container 102 of FIG. 1. It has further been discovered that the door guard 112 can be strategically placed to protect the drop lock rod 404 of FIG. 4 from tampering.

Figure 11:
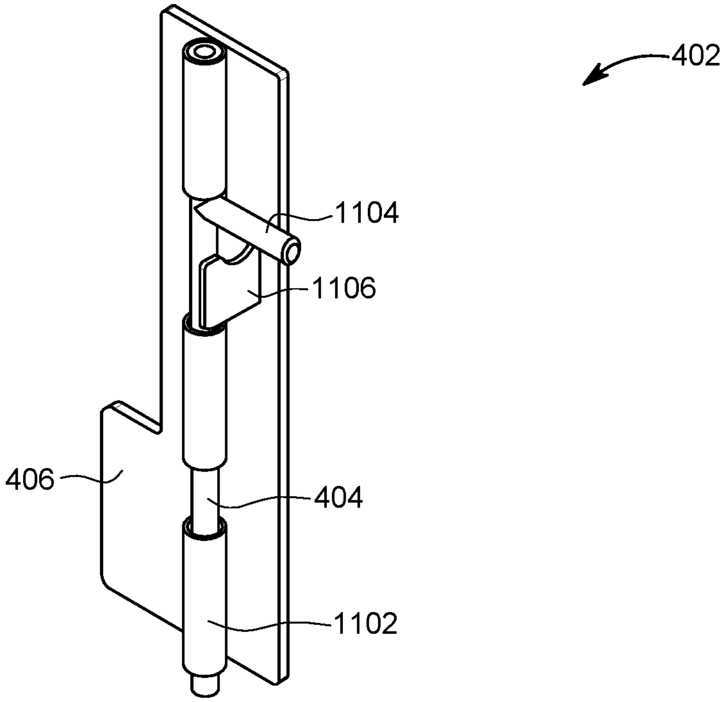
FIG. 11 is an isometric view of the drop lock of FIG. 4.

Referring now to FIG. 11, therein is shown an isometric view of the drop lock 402 of FIG. 4. The drop lock 402 is shown having the drop lock rod 404 extending through three drop lock guides 1102.

The drop lock guides 1102 can ensure the drop lock rod 404 is secured within the drop lock 402 and allow the drop lock rod 404 to move up and down within the drop lock 402. The drop lock rod 404 can further include a drop lock handle 1104.

The drop lock handle 1104 can allow a user to move the drop lock rod 404 up and down. When the drop lock rod 404 is in an up position, the drop lock handle 1104 can be placed in a drop lock handle holder 1106.

The drop lock tab 406 can extend out away from the drop lock rod 404. The drop lock tab 406 is shown formed integrally with the drop lock 402, however it is contemplated that the drop lock tab 406 could be formed separately and then welded to the drop lock 402.

Figure 12:
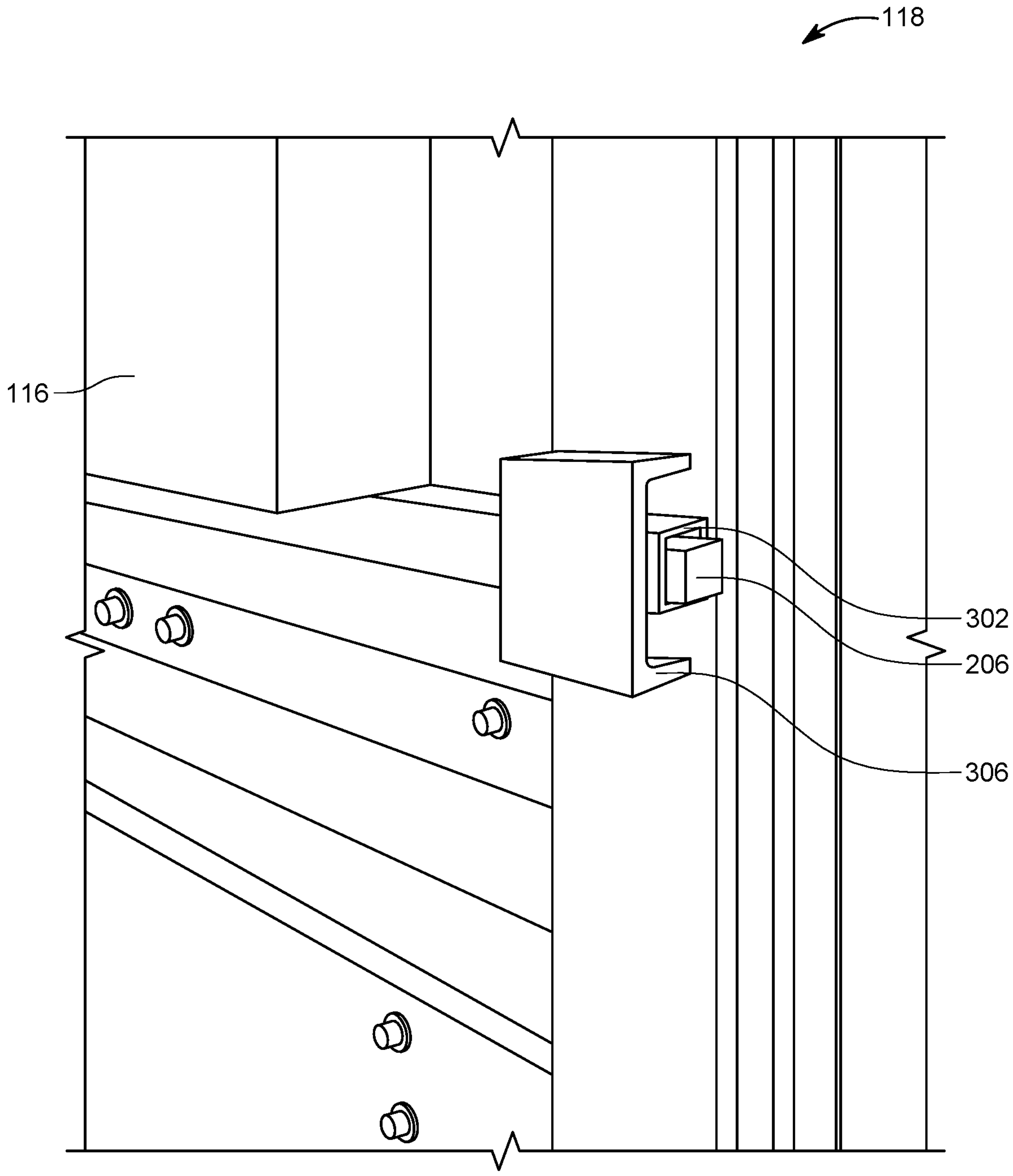
FIG. 12 is an interior isometric view of the right container door of FIG. 1.

Referring now to FIG. 12, therein is shown an interior isometric view of the right container door 118 of FIG. 1. The right container door 118 is shown having the lock box 116 above the sliding lock rod 206.

The sliding lock rod 206 is shown within the lock rod sleeve 302, which is directly affixed to the right container door 118. The U-channel 306 is shown welded to the right container door 118. The U-channel 306 is further shown extended over the lock rod sleeve 302 ensuring the sliding lock rod 206 is extended through the U-channel 306.

Figure 13:
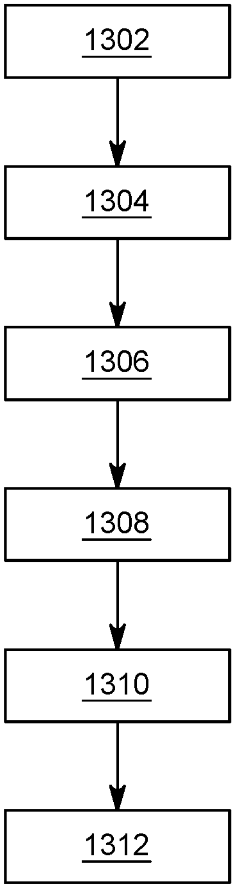
FIG. 13 is a flow chart for a method of manufacturing the locking system.

Referring now to FIG. 13, therein is shown a flow chart 1300 for a method of manufacturing the locking system. The method of manufacturing the locking system 100 can include: providing a cargo container having a first container door, a second container door, and a container frame base in a block 1302; affixing a lock box to the second container door, the lock box extended into and through the second container door, the lock box including a sliding lock rod configured to extend behind the first container door when the lock box is in a locked configuration in a block 1304; affixing a sliding lock rod guard to an exterior surface of the first container door and to the exterior surface of the second container door, the sliding lock rod guard for preventing access to the sliding lock rod from between the first container door and the second container door in a block 1306; affixing door guards to the second container door and the first container door for preventing the first container door and the second container door from being pushed into the cargo container in a block 1308; and affixing a drop lock to an interior surface of the first container door, the drop lock including a drop lock rod configured to extend down into the container frame base when the drop lock is in a locked configuration in a block 1310.

It has been discovered that the location of the sliding lock rod guard 114 together with the door guards 112 protect the sliding lock rod 206 drop lock rod 404 from being cut with a Sawzall. In addition, the container doors 104, the drop lock rod 404, the drop lock tab 406, sliding lock rod guard 114, and the sliding lock rod 206 working in tandem prevent the container doors from being pushed in or pulled out.

The dimension and positions of the lock box components including the lock box guard 226, the lock encasement 224, and the rain guard 216 prevent the lock 220 from being pried open with a crow bar or drilled out with a drill. It has been discovered that the angles and dimensions of the lock box 116, the location of the lock 220 inside the lock box 116, the extra steel of the lock box guard 226, the steel rain guard 216, and the steel lock encasement 224 around the lock 220 operate to protect the lock 220, which is the weakest link on any locking system.

The lock 220 is thereby protected from someone trying to drill out the keyhole 602, drill out the top of the lock 220, using different sized pry bars to try and pry the lock 220 off, or cutting the lock 220 with a Sawzall. All of the angles and position of the parts of and within the lock box 116 make it impossible to get a medium size or larger pry bar or drill into position to try and compromise the lock 220.

Thus, it has been discovered that the locking system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the locking system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A locking system comprising:

a cargo container having a first container door, a second container door, and a container frame base;

a lock box affixed to the second container door, the lock box extended into and through the second container door, the lock box including a sliding lock rod configured to extend behind the first container door when the lock box is in a locked configuration;

a sliding lock rod guard affixed to a first exterior surface of the first container door and affixed to a second exterior surface of the second container door, the sliding lock rod guard for preventing access to the sliding lock rod from between the first container door and the second container door;

a U-channel affixed to the second container door, the sliding lock rod being extended through the U-channel:

door guards affixed to the second container door and the first container door for preventing the first container door and the second container door from being pushed into the cargo container; and a drop lock affixed to an interior surface of the first container door, the drop lock including a drop lock rod configured to extend down into the container frame base when the drop lock is in the locked configuration.

2. The system of claim 1 wherein one of the door guards affixed to the first container door is positioned to prevent access to the drop lock rod from between the first container door and the container frame base.

3. The system of claim 1 wherein the sliding lock rod is a solid steel sliding lock rod, the sliding lock rod is configured to slide within a lock rod sleeve coupled to a bottom side of the lock box, and the sliding lock rod is configured to engage a lock rod receiver affixed to the interior surface of the first container door.

4. The system of claim 1 wherein the sliding lock rod guard includes a rod guard extended body and a rod guard edge protector, the rod guard extended body affixed to the second container door and extended laterally in front of the first container door when the first container door and the second container door are closed, the rod guard edge protector affixed to the first container door for preventing access to a space between the first container door and the rod guard extended body when the first container door and the second container door are closed.

5. A locking system comprising:

a cargo container having a first container door, a second container door, and a container frame base;

a lock box affixed to the second container door, the lock box extended into and through the second container door, the lock box including:

a rain guard, a handle, a lock encasement, a lock box guard, and a sliding lock rod, the handle coupled to the sliding lock rod, the sliding lock rod configured to extend behind the first container door when the lock box is in a locked configuration, the lock encasement affixed to a bottom side within the lock box and the lock encasement in contact with a first interior side of the lock box, the lock box guard affixed to a second interior side within the lock box, the second interior side opposite the first interior side, and the rain guard extended down from a top side of the lock box;

a lock configured to be placed within the lock encasement, the lock encasement, the rain guard, and the lock box guard for limiting access to the lock;

a sliding lock rod guard affixed to a first exterior surface of the first container door and affixed to a second exterior surface of the second container door, the sliding lock rod guard for preventing access to the sliding lock rod from between the first container door and the second container door;

a U-channel affixed to the second container door, the sliding lock rod being extended through the U-channel:

door guards affixed to the second container door and the first container door for preventing the first container door and the second container door from being pushed into the cargo container; and a drop lock affixed to an interior surface of the first container door, the drop lock including a drop lock rod configured to extend down into the container frame base when the drop lock is in the locked configuration.

6. The system of claim 5 wherein the lock box further includes a vertical coupling rod, and the handle coupled to the sliding lock rod with vertical coupling rod therebetween.

7. The system of claim 5 wherein the lock includes a keyhole, the keyhole facing the lock box guard when the lock is placed within the lock encasement.

8. The system of claim 5 wherein:

the lock box further includes a locking tab affixed to the sliding lock rod; and the lock includes a piston configured to extend through the locking tab when the lock box is in the locked configuration.

9. The system of claim 5 wherein the lock encasement includes lock notches for allowing the lock to be grasped and removed when the lock in in an unlocked configuration.

10. A method of manufacturing a locking system comprising:

providing a cargo container having a first container door, a second container door, and a container frame base;

affixing a lock box to the second container door, the lock box extended into and through the second container door, the lock box including a sliding lock rod configured to extend behind the first container door when the lock box is in a locked configuration;

affixing a sliding lock rod guard to a first exterior surface of the first container door and to a second exterior surface of the second container door, the sliding lock rod guard for preventing access to the sliding lock rod from between the first container door and the second container door;

affixing a U-channel to the second container door. the sliding lock rod being extended through the U-channel:

affixing door guards to the second container door and the first container door for preventing the first container door and the second container door from being pushed into the cargo container; and affixing a drop lock to an interior surface of the first container door, the drop lock including a drop lock rod configured to extend down into the container frame base when the drop lock is in the locked configuration.

11. The method of claim 10 wherein affixing the door guards to the first container door includes affixing one of the door guards positioned to prevent access to the drop lock rod from between the first container door and the container frame base.

12. The method of claim 10 wherein affixing the lock box includes affixing the lock box having a solid steel sliding lock rod, the sliding lock rod configured to slide within a lock rod sleeve coupled to a bottom side of the lock box, and the sliding lock rod configured to engage a lock rod receiver affixed to the interior surface of the first container door.

13. The method of claim 10 wherein affixing the sliding lock rod guard includes affixing a rod guard extended body and a rod guard edge protector, the rod guard extended body affixed to the second container door and extended laterally in front of the first container door when the first container door and the second container door are closed, the rod guard edge protector affixed to the first container door for preventing access to a space between the first container door and the rod guard extended body when the first container door and the second container door are closed.

14. The method of claim 10 wherein:

affixing the lock box includes affixing the lock box having:

a rain guard, a handle, a lock encasement, a lock box guard, and a sliding lock rod, the handle coupled to the sliding lock rod, the lock encasement affixed to a bottom side within the lock box and the lock encasement in contact with a first interior side of the lock box, the lock box guard affixed to a second interior side within the lock box, the second interior side opposite the first interior side, and the rain guard extended down from a top side of the lock box; and providing a lock configured to be placed within the lock encasement, the lock encasement, the rain guard, and the lock box guard for limiting access to the lock.

15. The method of claim 14 wherein the affixing the lock box further includes affixing the lock box with a vertical coupling rod, and the handle coupled to the sliding lock rod with vertical coupling rod therebetween.

16. The method of claim 14 wherein providing the lock includes providing the lock having a keyhole, the keyhole facing the lock box guard when the lock is placed within the lock encasement.

17. The method of claim 14 wherein:

affixing the lock box includes affixing the lock box having a locking tab affixed to the sliding lock rod; and providing the lock includes providing the lock having a piston configured to extend through the locking tab when the lock box is in the locked configuration.

18. The method of claim 14 wherein affixing the lock box includes affixing the lock box with the lock encasement including lock notches for allowing the lock to be grasped and removed when the lock in in an unlocked configuration.

* * * * *